United States Patent
Yuta et al.

(10) Patent No.: US 7,059,022 B2
(45) Date of Patent: Jun. 13, 2006

(54) SPACER FOR ATTACHING A DASH SILENCER

(75) Inventors: Kiyoteru Yuta, Toyohashi (JP); Osamu Uemura, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/787,866

(22) Filed: Feb. 26, 2004

(65) Prior Publication Data

US 2004/0163218 A1 Aug. 26, 2004

Related U.S. Application Data

(63) Continuation of application No. PCT/US02/27538, filed on Aug. 29, 2002.

(30) Foreign Application Priority Data

Sep. 3, 2001 (JP) .............................. 2001-265433

(51) Int. Cl.
*A44B 21/00* (2006.01)
(52) U.S. Cl. ........................................ 24/297; 24/682.1
(58) Field of Classification Search ................ 411/182, 411/433, 437, 508–511, 913; 24/297, 662, 24/671, 682.1; 296/39.3, 1.08, 39.1, 39.2; 52/787.1–787.12, 716.6, 718.04, 718.05, 52/718.02; 16/2.1
See application file for complete search history.

(56) References Cited

U.S. PATENT DOCUMENTS

| | | | |
|---|---|---|---|
| 1,373,645 A | * | 4/1921 | Bandoly ..................... 411/74 |
| 4,743,152 A | * | 5/1988 | Nakayama et al. .......... 411/182 |
| 4,927,306 A | * | 5/1990 | Sato ........................... 411/182 |
| 4,978,265 A | | 12/1990 | De Wan |
| 5,098,242 A | * | 3/1992 | Schaty ....................... 411/437 |
| 5,291,639 A | * | 3/1994 | Baum et al. .................. 24/297 |
| 5,807,052 A | | 9/1998 | Van Boven et al. |
| 6,174,118 B1 | | 1/2001 | Rebers et al. |
| 6,283,689 B1 | * | 9/2001 | Roytberg et al. ............. 411/61 |
| 6,582,171 B1 | | 6/2003 | Bondarowicz et al. |
| 6,623,226 B1 | | 9/2003 | Braun et al. |
| 6,769,851 B1 | | 8/2004 | Agha et al. |
| 2004/0141829 A1 | | 7/2004 | Maruyama et al. |

* cited by examiner

FOREIGN PATENT DOCUMENTS

EP 0 590 993 A 4/1994

*Primary Examiner*—James R. Brittain
(74) *Attorney, Agent, or Firm*—Harness, Dickey & Pierce, P.L.C.

(57) ABSTRACT

A spacer (10) to be inserted into a dash silencer comprises a cylindrical hollow body (12), a first flange (13) extending radially outward from one of the ends of the body, a second flange (a contact flange) (14) extending radially outward from the other end of the body, and a plurality of engagement pawls each extending from the outer surface of the other end of the body toward the first flange. The engagement pawls include a resilient engagement pawl (17) and a rigid engagement pawl (18). The contact flange has an outer diameter slightly larger than the hole diameter of a mounting hole formed in the dash silencer to allow the spacer to be readily inserted into the mounting hole. Each of the engagement pawls (17, 18) has an outer shape expanding upwards outward to allow the spacer to be inserted into the mounting hole while aligning the respective centers of the spacer the mounting hole with one another. The resilient engagement pawl (18) is adapted to engage with the lower surface of a rubber sheet (8) of the dash silencer (7) after the insertion operation of the spacer, so as to fasten the spacer to the dash silencer.

14 Claims, 7 Drawing Sheets

SPACER FOR ATTACHING A DASH SILENCER

CROSS-REFERENCE TO RELATED APPLICATIONS

This application is a continuation of PCT International Application No. PCT/US02/27538, filed Aug. 29, 2002, and claims benefit of Japanese Patent Application No. 2001-265433, filed Sep. 3, 2001. The disclosures of the above applications are incorporated herein by reference.

FIELD OF THE INVENTION

The present invention relates to a spacer used in a dash silencer. In particular, the present invention relates to a spacer for attaching a dash silencer, capable of facilitating the insertion operation therefor.

BACKGROUND OF THE INVENTION

Generally, in a process for attaching a dash noise-insulator or dash silencer to a vehicle body, a dash silencer is attached to a vehicle body by fastening a spacer to a mounting hole formed penetratingly in the dash silencer, and engaging the spacer with a stud standing on the vehicle body. In many cases, another bracket is also attached to the vehicle body together with the dash silencer.

Figure 9A:
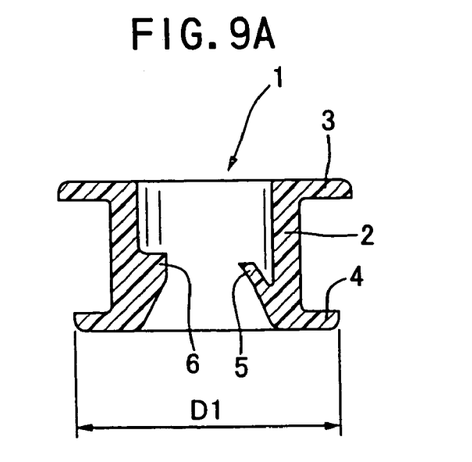
FIG. 9A is a sectional view of a conventional spacer.
Figure 9B:
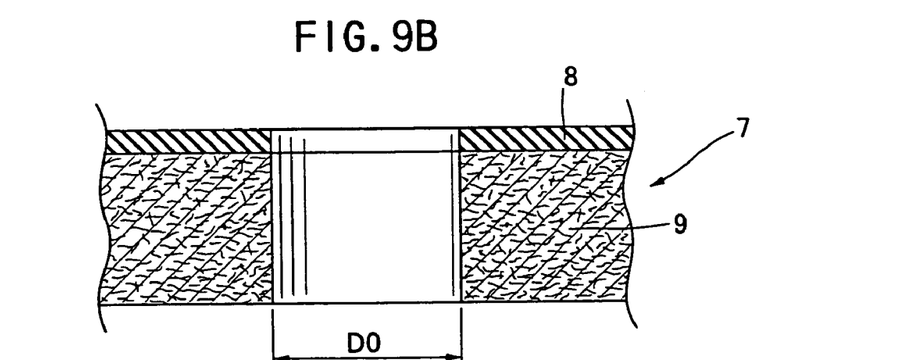
FIG. 9B is a partial sectional view of a dash silencer in the vicinity of a spacer-mounting hole thereof.
Figure 9C:
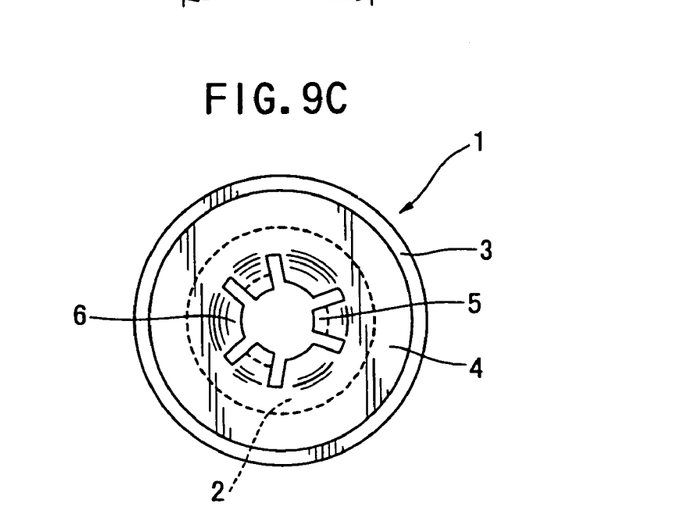
FIG. 9C is a bottom view of the conventional spacer.
Figure 10:
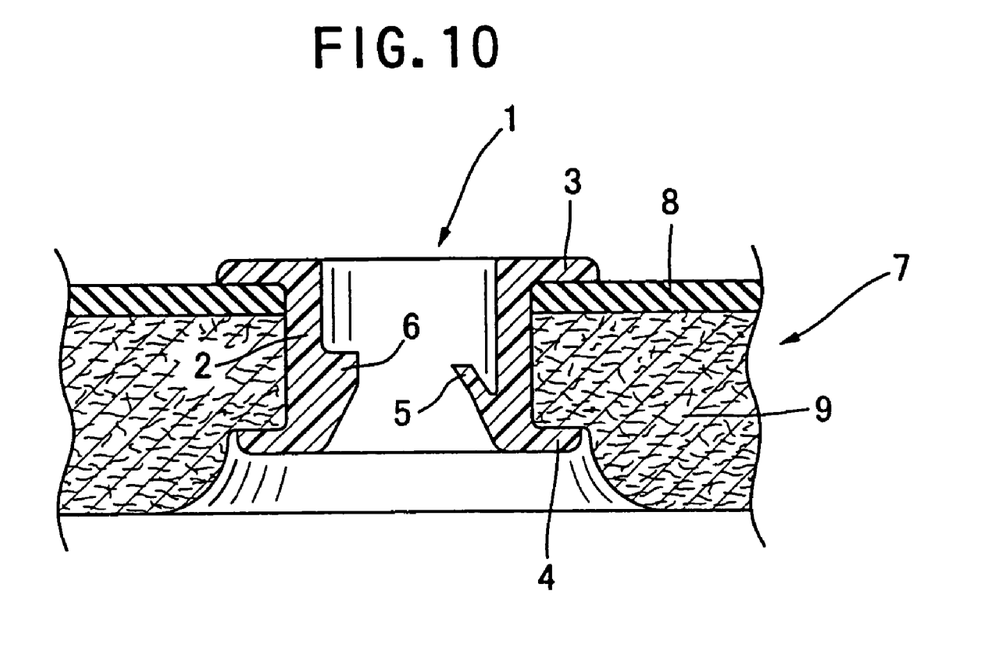
FIG. 10 is a sectional view of the dash silencer with the conventional spacer fastened thereto.

FIG. 9A is a sectional view of a conventional spacer, FIG. 9B is a partial sectional view of a dash silencer in the vicinity of a spacer-mounting hole thereof, and FIG. 9C is a bottom view of the conventional spacer. FIG. 10 is a sectional view of the dash silencer with the conventional spacer fastened thereinto. The conventional spacer 1 is an integral product made of synthetic resin. The spacer 1 comprises a hollow body 2, a flange 3 extending radially outward from one of the ends of the body 2, a contact flange 4 extending radially outward from the other end of the body, a plurality of stud engagement pawls 5, and a plurality of stud guide pawls 6. Each of the stud engagement and stud guide pawls extends from the other end of the body toward the hollow portion of the body. The dash silencer 7 comprises a rubber sheet 8, a felt layer 9 attached to the rubber sheet, and a spacer-mounting hole is penetratingly formed therein.

In an operation for fastening the spacer 1 to the dash silencer 7, the spacer 1 is forcedly inserted into the mounting hole of the dash silencer 7 by use of a rod, and fixed as shown in FIG. 10. The contact flange 4 of the spacer 1 has an outer diameter D1 larger than the hole diameter D0 of the mounting hole of the dash silencer 7. The outer diameter of contact flange 4 is designed in a large dimension allowing the contact flange 4 to be engaged with the lower surface of the dash silencer 7 so as to assure a reliable fixation of the spacer 1. Thus, it has been difficult to manually handle the above insertion operation due to a strong pushing force required for inserting the spacer 1. Further, after inserting the spacer 1, it has been required to forcedly deform the lower surface of the felt layer 9 of the dash silencer 7 upward to bring the lower surface around the mounting hole into engagement with the contact flange 4 so as to prevent the disengagement of the spacer 1. This leads to significantly inefficient operations.

In view of the above problems, it is therefore an object of the present invention to provide a spacer capable of facilitating the insertion operation therefor and reducing the time for the operation.

It is another object of the present invention to provide a spacer capable of being fastened through one-touch operation without using any tool.

It is still another object of the present invention to provide a spacer capable of being inserted into a mounting hole of a dash silencer while aligning the respective centers of the spacer and the mounting hole with one another so as to perform the insertion operation with a stable pushing force.

It is yet another object of the present invention to provide a spacer capable of being reliably fastened to a dash silencer and hardly disengaged from the dash silencer.

SUMMARY OF THE INVENTION

According to the present invention, there is provided a spacer for attaching a dash silencer. The spacer comprises, a cylindrical hollow body, a first flange extending radially outward from one of the ends of the body, a second flange (contact flange) extending radially outward from the other end of the body, and a plurality of engagement pawls each extending radially outward from the outer surface of the other end of the body toward the first flange.

In one embodiment of the present invention, the engagement pawls include a resilient engagement pawl connected to the body only through the lower end thereof, and a rigid engagement pawl connected to the body throughout between the lower and upper ends thereof.

The resilient engagement pawl has an upper end adapted to engage with the lower surface of a rubber sheet of the dash silencer.

In another embodiment of the present invention, the spacer includes a stud engagement pawl and a stud guide pawl. Each of the stud engagement and stud guide pawls extends from the other end of the body toward the hollow portion of the body.

In the conventional spacer, when the spacer is fastened to a dash silencer, the contact flange has two functions; one for keep a desirable thickness of the dash silencer by being brought into contact with a vehicle body or the like, the other for fastening the spacer. In contrast, according to the present invention, the contact flange has a reduced outer diameter for facilitating the insertion operation of the spacer. The upward outward expanded configuration of the engagement pawl allows the spacer to be inserted while aligning the respective centers of the spacer and mounting hole with one another. Further, the engagement pawl acts to fasten the spacer after the insertion operation.

DETAILED DESCRIPTION OF THE PREFERRED EMBODIMENT

With reference to the drawings, one embodiment of the present invention will now be described.

Figure 1:
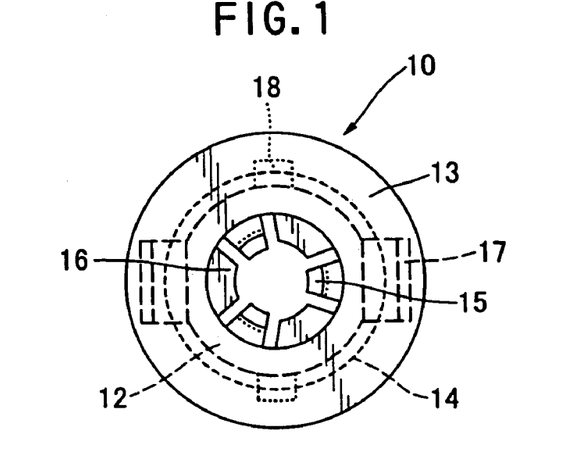
FIG. 1 is a top plan view of a spacer according to one embodiment of the present invention.
Figure 2:
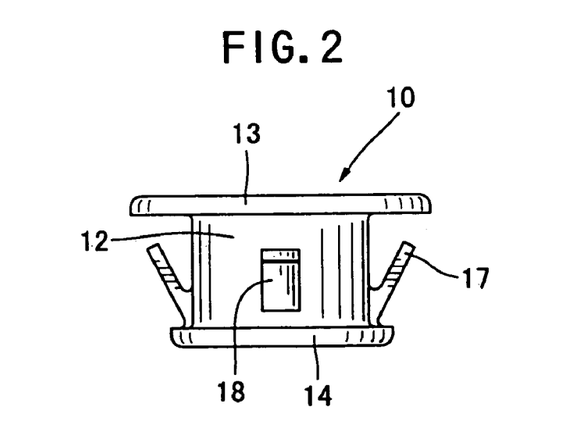
FIG. 2 is a front plan view of the spacer according to one embodiment of the present invention.
Figure 3:
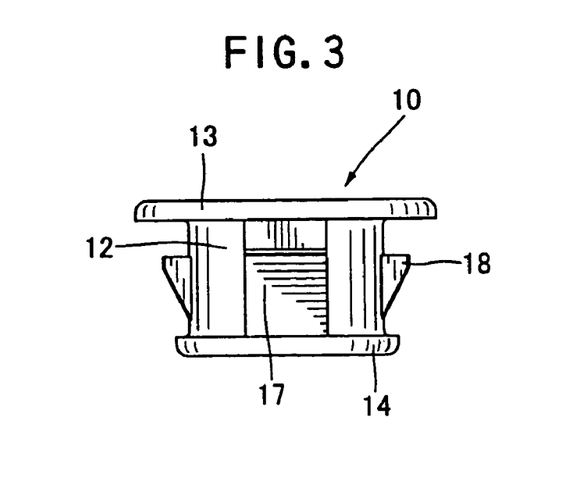
FIG. 3 is a right side view of the spacer according to one embodiment of the present invention.
Figure 4A:
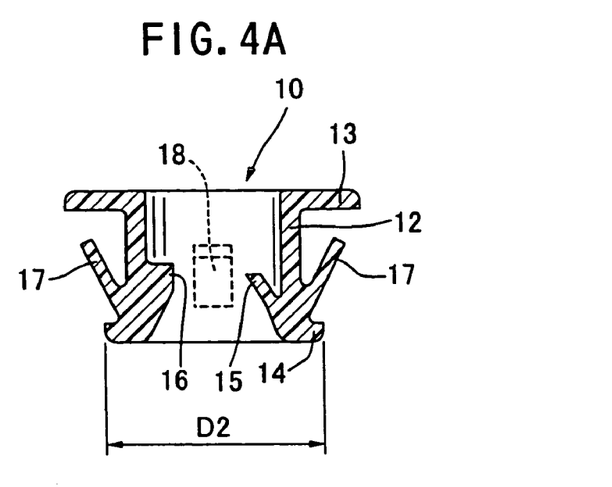
FIG. 4A is a sectional view of the spacer.
Figure 4B:
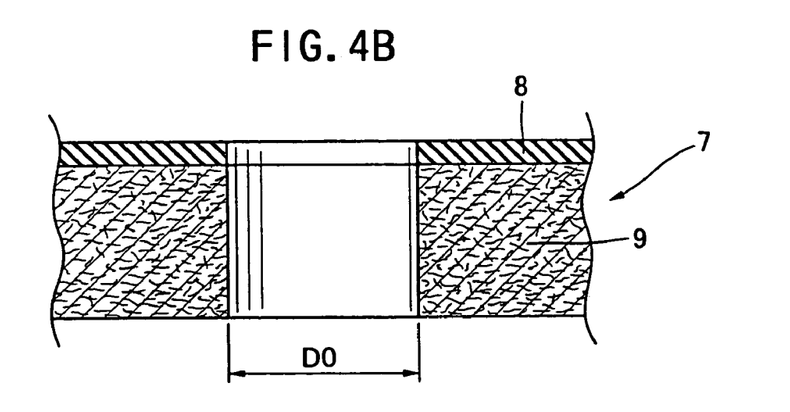
FIG. 4B is a sectional view of a dash silencer in the vicinity of a spacer-mounting hole thereof.
Figure 4C:
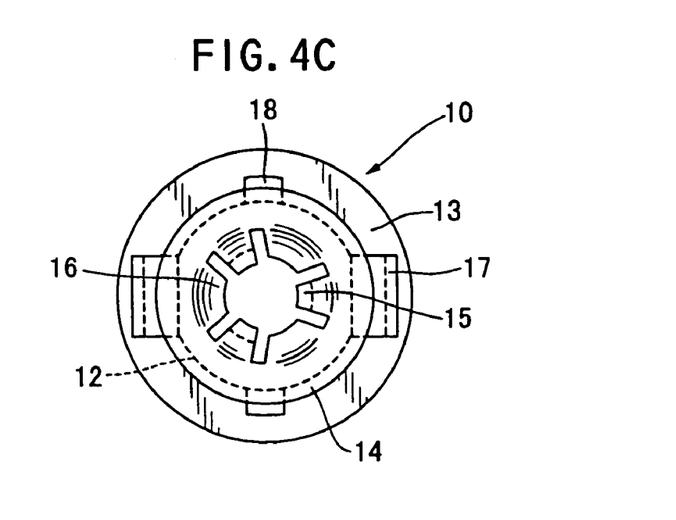
FIG. 4C is a bottom view of the spacer.
Figure 5:
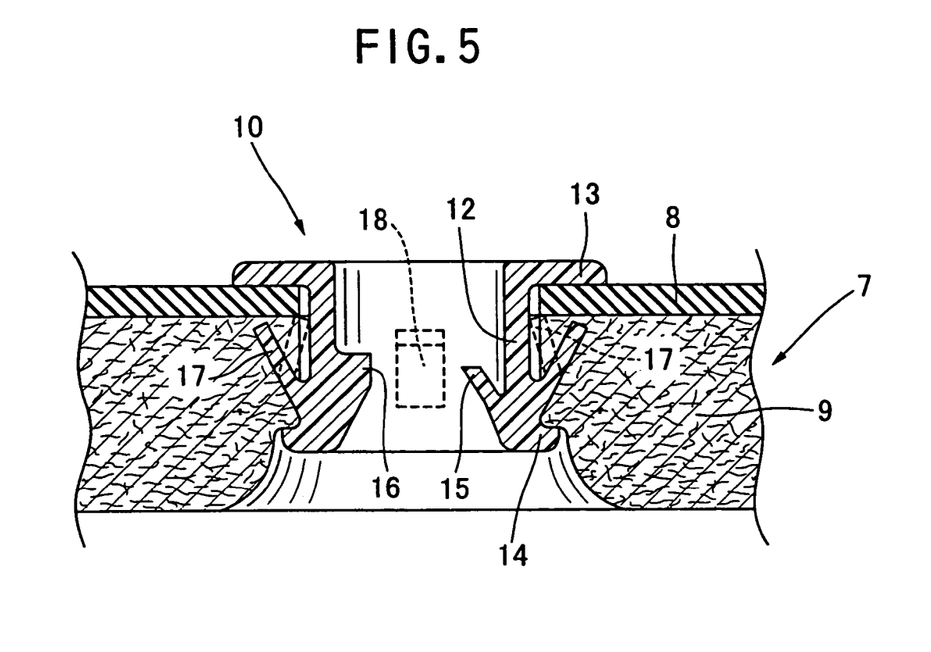
FIG. 5 is a sectional view showing the state after the spacer is fastened to the dash silencer.

FIGS. 1 to 5 show a spacer 10 according to one embodiment of the present invention. FIGS. 1, 2 and 3 are top plan, front and right side views of the spacer, respectively. FIG. 4A is a sectional view of the spacer 10, FIG. 4B is a partial sectional view of a dash silencer 7 in the vicinity of a spacer-mounting hole thereof, and FIG. 4C is a bottom view of the spacer 10. FIG. 5 is a sectional view of the dash silencer 7 and the spacer 10 fastened thereto. The term "upper" herein means the upward direction on the sheet of FIG. 5.

Referring to FIG. 4A, the spacer 10 of the present invention is an integral product made of synthetic resin. The spacer 10 comprises a cylindrical hollow body 12; a flange (first flange) 13 extending radially outward from one (upper end) of the ends of the body 12; and a contact flange (second flange) 14, or a flange having a surface to be brought into contact with the lower surface of the dash silencer, extending radially outward from the other end of the body 12.

The spacer 10 further includes a plurality of stud engagement pawls 15, and a plurality of stud guide pawls 16. Each of the stud engagement and guide pawls extends from the other end of the body toward the hollow portion of the body. The spacer can engage with a stud through the stud engagement pawls 15, and the stud guide pawls 16.

The dash silencer 7 shown in FIG. 4B is the same as that described in the Background section. That is, the dash silencer 7 comprises a rubber sheet 8, a felt layer 9 attached to the rubber sheet, and a spacer-mounting hole. The flange 13 has an outer diameter larger than the hole diameter of the mounting hole of the dash silencer 7. When the spacer 10 is inserted into the mounting hole, the lower surface of the flange 13 is brought into contact with the upper surface of the dash silencer 7 to keep the spacer from being further inserted. The contact flange 14 has an outer diameter D2 larger than the hole diameter D0 of the mounting hole of the dash silencer 7, but smaller than the outer diameter D1 of the flange 4 of the conventional spacer 1 to allow the spacer to be readily inserted into the mounting hole.

The spacer 10 includes a pair of resilient engagement pawls 17 each extending radially outward from the outer surface of the other end (lower end) of the body 12 toward the upper side of the spacer. The resilient engagement pawls 17 has a lower end connected to the body 12, and an upper end spaced apart from the outer surface of the body 12. When the spacer 10 is inserted into the mounting hole of the dash silencer 7, the respective upper ends of the engagement pawls 17 are deformed radially inward to allow the spacer to be inserted into the mounting hole.

The spacer 10 further includes a pair of rigid engagement pawls 18 each located at a position offset from the corresponding resilient engagement pawl 17 in the circumferential direction of the body by 90 degree. The rigid engagement pawl extends radially outward from the other end (lower end) of the body 12 toward the upper side of the spacer. As shown in FIGS. 2 and 3, the rigid engagement pawl 18 is connected to the body throughout between the lower and upper ends thereof. Thus, the upper end of the rigid engagement pawl is hardly deformed radially inward. The rigid engagement pawl 18 is adapted to reliably engage with the rubber sheet 8 of the dash silencer 7 to prevent the disengagement of the pacer even if the rubber sheet is deformed.

Each of the pair of resilient engagement pawls 17 and the pair of rigid engagement pawls 18 has a configuration expanding gradually outward from the lower end to the upper end (or as going upward). During the insertion operation of the spacer, this configuration allows the spacer to be readily inserted into the mounting hole of the dash silencer 7, and acts to align the respective centers of the spacer and the mounting hole with one another.

FIG. 5 is a sectional view showing the state after the spacer 10 is fastened to the dash silencer 7. Referring to this figure, the operation for inserting the spacer 10 into the dash silencer 7 will be described below. The spacer 10 is inserted into the mounting hole of the dash silencer 7 from above the rubber sheet 8. Since the outer diameter of the contact flange 14 is limited to a slightly lager dimension than the hole diameter of the mounting hole of the dash silencer 7, an operator can manually let the spacer into the mounting hole without any difficulty. As the spacer 10 is pushed into the mounting hole, the resilient engagement pawls are deformed as shown by the broken lines in FIG. 5 to pass through the mounting hole portion of the rubber sheet 8. Since each of the resilient and rigid engagement pawls 17, 18 has a configuration expanding outward as going upward, the spacer 10 is inserted into the mounting hole while aligning the respective centers of the spacer and the mounting hole with one another.

When the flange 13 of the spacer 10 is brought into contact with the upper surface of the rubber sheet 8, each of the upper ends of the resilient engagement pawls 17 moves radially outward with respect to the body of the spacer 10 to engage with the lower surface of the rubber sheet 8 around the mounting hole so as to prevent the disengaging of the spacer 10. Further, the rigid engagement paws also bite into the felt layer 9 to fasten the spacer 10.

In the conventional spacer, the contact flange to be in contact with a vehicle body has a function of fastening the spacer to the dash silencer. Thus, the contact flange has been essentially designed to have a substantially larger outer diameter than the hole diameter of the mounting hole, resulting in tough insertion operation of the spacer. In the embodiment of the present invention, the outer diameter of the contact flange is reduced as compared to the conventional one, or is set in a slightly larger than the hole diameter of the mounting hole. Further, in order to fasten the spacer 10, the resilient and rigid engagement pawls are adapted to engage with the dash silencer on the lower surface side of the rubber sheet 8. This allows the spacer to be inserted with lower pushing force, which achieves facilitated insertion operation. This also eliminates the need for the operation of forcedly deforming the lower surface of the felt layer 9 upward to bring the lower surface around the mounting hole into engagement with the contact flange. Thus, the spacer can be reliably fastened to the dash silencer and hardly disengaged from the dash silencer.

Figure 6A:
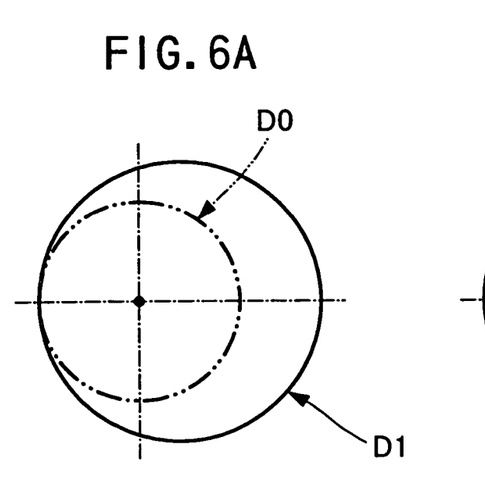
FIG. 6A is a diagram showing the relationship between the hole diameter D0 of the mounting hole of the dash silencer 7 and the outer diameter D1 of the contact flange of the conventional spacer 1.
Figure 6B:
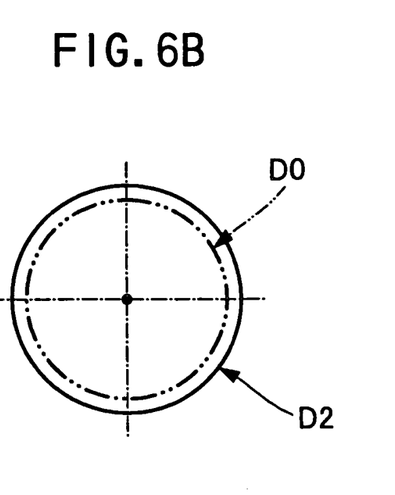
FIG. 6B is a diagram showing the relationship between the hole diameter D0 of the mounting hole of the dash silencer 7 and the outer diameter D2 of the contact flange of the spacer 10 according to one embodiment.

FIGS. 6A and 6B are explanatory diagrams showing the relationship between the hole diameter D0 of the mounting hole of the dash silencer 7 and the outer diameter D1 of the contact flange of the conventional spacer 1, and the relationship between the hole diameter D0 of the mounting hole of the dash silencer 7 and the outer diameter D2 of the contact flange of the spacer 10 according to this embodiment, respectively. The conventional spacer 1 in FIG. 6A has an outer diameter D1 greater than the hole diameter D0 of the mounting hole, thereby it is difficult to align the respective centers of the spacer and the mounting hole with one another during the insertion operation. Since the spacer 10 of this embodiment in FIG. 6B has a relatively small outer diameter D2 of the contact flange, and each of the resilient engagement pawls 17 and the rigid engagement pawls 18 has the upward outward expanding configuration. Thus, the spacer can be inserted into the mounting hole while keeping the alignment of the respective centers of the spacer and the mounting hole.

While this embodiment includes a pair of resilient engagement pawls 17 and a pair of the rigid engagement pawls 18, the respective numbers of the resilient and rigid engagement pawls 17, 18 are not limited to two. For example, four resilient engagement pawls 17 may be provided without the rigid engagement pawl 18. Alternatively, four rigid engagement pawls 18 may be provided without the resilient engagement pawl 17. Otherwise, the total number of the pawls may be increased, for example, four resilient engagement pawls 17 and four rigid engagement pawls 18.

Figure 7:
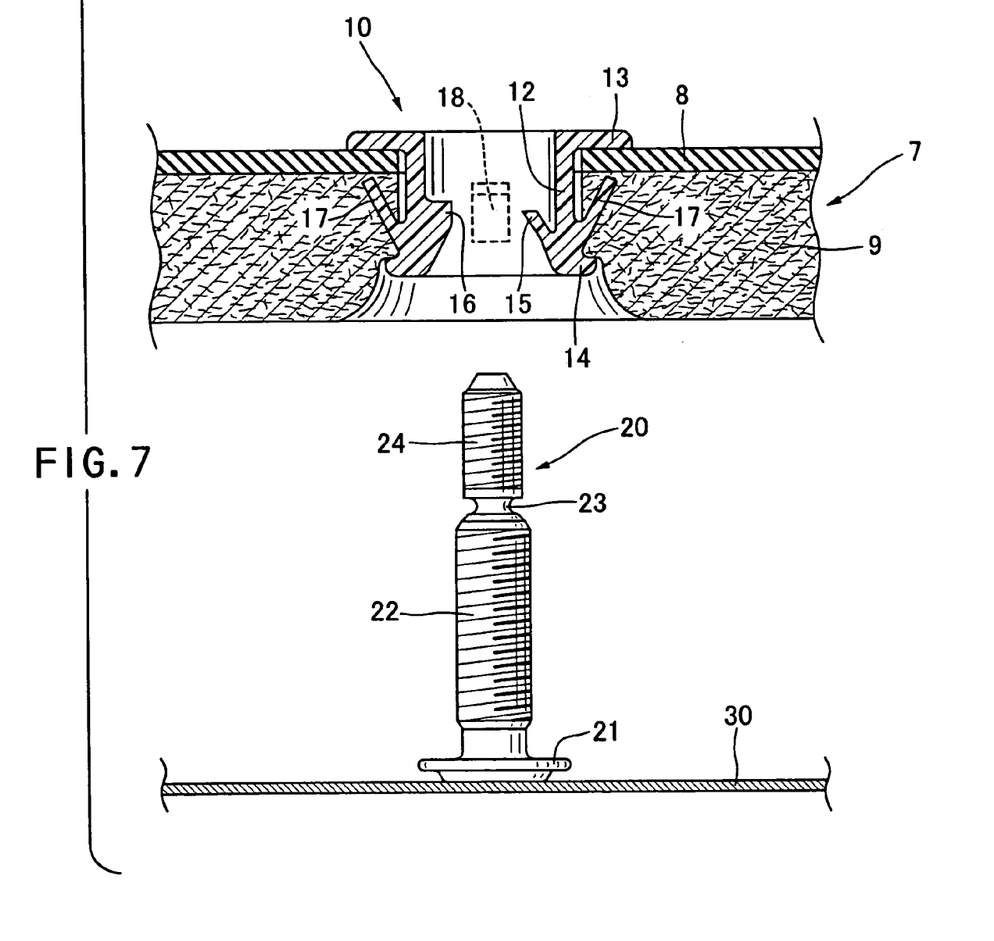
FIG. 7 is a sectional view showing the state before the dash silencer is attached to a vehicle body.
Figure 8:
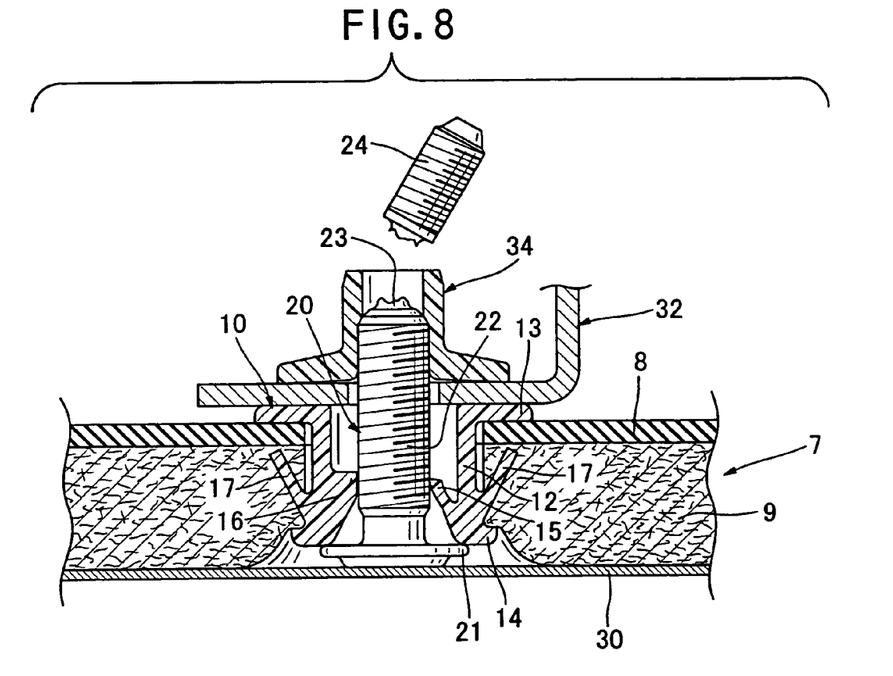
FIG. 8 is a sectional view showing the state after the dash silencer is attached to the vehicle body.

With reference to FIGS. 7 and 8, the operation of attaching the dash silencer 7 to a vehicle body 30 will be described below. The dash silencer 7 is attached to the vehicle body 30 by engaging the dash silencer 7 having the spacer 10 fastened thereto with a stud 20 standing on the vehicle body 30. The stud engagement and stud guide pawls of the spacer 10 facilitate inserting the stud 20 into the hollow portion of the spacer 10, and then can engage the inserted stud 20. The stud 20 includes a flange 21 in contact with the vehicle body 20, a columnar stud body 22, a small-diameter portion 23 on the upper side of the stud body, and a columnar end portion 24 on the upper side of the small-diameter portion. The stud body 22 and the end portion 24 are formed with male threads. After the dash silencer 7 is attached to the vehicle body 30, the small-diameter portion 23 of the stud 20 can be broken with a tool.

FIG. 8 shows the state after the dash silencer 7 is attached to the vehicle body 30. In the course of inserting the stud 20 into the hollow portion of the spacer 10 fastened to the dash silencer 7, the dash silencer 7 is stopped when the contact flange 14 of the spacer 10 is brought into contact with the flange 21 of the stud 20. The dash silencer 7 is temporarily fixed at this position. Then, a bracket 32 is attached to the stud 20, and a sleeve 34 is additionally attached to the stud from the upper side of the bracket. The sleeve 34 is rotated by a tool (not shown) to engage with the threads of the stud body 22. After the sleeve sufficiently engages with the stud body, the end portion 24 is strongly pulled by the tool to break the stud 20 at the small-diameter portion 23. In this manner, the dash silencer 7 is attached to the vehicle body 30.

As described above, the present invention provides a spacer capable of facilitating the operation for inserting it into the dash silencer and reducing the time for the operation. The present invention also provides a spacer capable of being fastened through one-touch operation without using any tool. Further, according to the present invention, the spacer can be inserted into the mounting hole of the dash silencer while aligning the respective centers of the spacer and the mounting hole with one another so as to perform the insertion operation with a stable pushing force. Furthermore, the spacer can be fastened through the resilient engagement pawl to assure that the spacer is reliably fixed to the dash silencer.

We claim:

1. A spacer for attaching a dash silencer, said spacer comprising:
   a cylindrical body having opposing first and second ends and an outer surface defining a substantially hollow central portion;
   a first flange extending radially outward from the first end of said body;
   a second flange extending radially outward from the second end of said body; and
   a plurality of engagement pawls connected to the outer surface between the first and second flanges approximate to the second flange and each extending radially outward from the outer surface and tapering outward toward said first flange and away from said hollow central portion;
   wherein said engagement pawls include:
      at least one resilient engagement pawl integrally connected to said body adjacent to said second flange; and
      at least one rigid engagement pawl having a lower end and an upper end, said rigid engagement pawl being continuously connected to said outer surface of said body between the lower and upper ends.

2. A spacer as defined in claim 1, wherein said resilient engagement pawl further comprises a free upper end adapted to engage with said dash silencer.

3. A spacer as defined in claim 1,
   at least two stud engagement pawls; and
   at least two stud guide pawls;
   wherein each of said stud engagement and stud guide pawls operably extend from said body inward toward the hollow portion of said body and opposite from the plurality of engagement pawls.

4. The spacer according to claim 3, wherein any one of the stud engagement pawls directly opposes one of the stud guide pawls.

5. The spacer according to claim 3, further comprising:
   three stud engagement pawls; and
   three stud guide pawls;
   wherein each of the three stud engagement pawls directly opposes one of the three stud guide pawls.

6. The spacer according to claim 1, wherein any one of the resilient engagement pawls is separated from any one of the rigid engagement pawls in a circumferential direction measurable in increments of 90 degrees.

7. The spacer according to claim 1, wherein the at least one resilient engagement pawl further comprises an opposed pair of resilient pawls.

8. The spacer according to claim 1, wherein the at least one rigid engagement pawl comprises an opposed pair of rigid engagement pawls.

9. The spacer according to claim 1, wherein each of the first and second flanges comprise continuously formed circular flanges.

10. A dash silencer spacer, comprising:
- a cylindrical body having opposing first and second ends and an outer surface defining a substantially hollow central portion;
- a first member extending radially outward from the first end of the body;
- a second member extending radially outward from the second end of the body; and
- a plurality of engagement elements, including:
  - an opposed pair of resilient engagement pawls connected at least to the outer surface between the first and second members and facing outward from the outer surface;
  - a plurality of stud engagement pawls, the stud engagement pawls being positioned facing the hollow central portion and connected only to the cylindrical body; and
  - at least one rigid engagement pawl having a lower end and an upper end, the rigid engagement pawl integrally connected only to the outer surface between the lower and upper ends and positioned facing outward from the outer surface.

11. The spacer of claim 10, further comprising a plurality of stud guide pawls each positioned opposite to one of the stud engagement pawls and facing the hollow central portion.

12. The spacer of claim 10, wherein the second member comprises a circular flange, the resilient engagement pawls being integrally joined to both the outer surface and the circular flange.

13. The spacer of claim 10, further comprising:
- the first member having a first diameter; and
- the second member having a second diameter smaller than the first diameter.

14. The spacer of claim 10, wherein the at least one rigid engagement pawl is connected to the outer surface between the first and second members and between the pair of resilient engagement pawls.

* * * * *

UNITED STATES PATENT AND TRADEMARK OFFICE
CERTIFICATE OF CORRECTION

| | |
|---|---|
| PATENT NO. | : 7,059,022 B2 |
| APPLICATION NO. | : 10/787866 |
| DATED | : June 13, 2006 |
| INVENTOR(S) | : Kiyoteru Yuta et al. |

It is certified that error appears in the above-identified patent and that said Letters Patent is hereby corrected as shown below:

Column 6,
Line 41, after "claim 1" insert -- further comprising --.

Signed and Sealed this

Nineteenth Day of September, 2006

JON W. DUDAS
*Director of the United States Patent and Trademark Office*